(12) United States Patent  
Crosby

(10) Patent No.: US 7,877,970 B1  
(45) Date of Patent: Feb. 1, 2011

(54) BIOMASS HARVESTING SYSTEM

(76) Inventor: Lon Owen Crosby, 1685 301st St., Webster City, IA (US) 50595-7450

( * ) Notice: Subject to any disclaimer, the term of this patent is extended or adjusted under 35 U.S.C. 154(b) by 709 days.

(21) Appl. No.: 11/824,845

(22) Filed: Jul. 3, 2007

Related U.S. Application Data

(60) Provisional application No. 60/818,988, filed on Jul. 5, 2006.

(51) Int. Cl.
 *A01D 41/14* (2006.01)
 *A01D 39/00* (2006.01)

(52) U.S. Cl. ...................... 56/10.2 R; 56/341

(58) Field of Classification Search ............. 56/10.2 R, 56/10.2 A, 10.2 D, 10.2 E, 10.2 F, 10.2 G, 56/10.2 J, 341, 192, 500, 504, 505, DIG. 15
 See application file for complete search history.

(56) References Cited

U.S. PATENT DOCUMENTS

| | | | | |
|---|---|---|---|---|
| 2,817,945 A * | 12/1957 | McClellan | .......... | 56/1 |
| 4,172,500 A * | 10/1979 | Smith | .......... | 171/101 |
| 4,551,801 A * | 11/1985 | Sokol | .......... | 701/32 |
| 5,103,623 A * | 4/1992 | Herrett | .......... | 56/14.7 |
| 6,041,582 A * | 3/2000 | Tiede et al. | .......... | 56/10.2 A |
| 6,931,828 B2 * | 8/2005 | Kormann | .......... | 56/250 |
| 7,032,369 B1 * | 4/2006 | Eaton et al. | .......... | 56/233 |
| 7,287,365 B2 * | 10/2007 | Dubois | .......... | 56/341 |
| 7,401,547 B2 * | 7/2008 | Degen | .......... | 100/43 |
| 7,404,283 B2 * | 7/2008 | Viaud | .......... | 56/228 |
| 2005/0126144 A1 * | 6/2005 | Koselka et al. | .......... | 56/10.2 R |

* cited by examiner

*Primary Examiner*—Alicia M Torres
(74) *Attorney, Agent, or Firm*—Steven C Wichmann

(57) ABSTRACT

A biomass harvesting system for harvesting agricultural plant growth from agricultural fields comprises in operative combination a power source for providing mechanical and electric power to the system, a biomass accumulator for producing discrete units of accumulated biomass and a windrower for feeding biomass to the biomass accumulator. The system also includes a biomass quality analyzer for determining a set of quality characteristics of the accumulated biomass, a dirt control system for controlling the quantity of dirt in the accumulated biomass, and a ground cover residue monitor for determining on optimal quantity of biomass residue to remain on the agricultural field. An active tracking system identifies individual ones of the discrete units of accumulated biomass.

17 Claims, 5 Drawing Sheets

BIOMASS HARVESTING SYSTEM

CROSS REFERENCE TO RELATED APPLICATIONS

This application claims the benefit of U.S. Provisional Patent Application Ser. No. 60/818,988, filed 5 Jul. 2006.

BACKGROUND OF THE INVENTION

1. Field of the Invention

The present invention relates to agricultural harvesting systems in general and more particularly to a system for the selective collection of plant growth commonly known as biomass.

2. Discussion of the Related Art

In recent years our society and the world in general has become increasingly more and more energy dependent. The resulting rise in energy demands have coupled with rising costs for petroleum based fuels to kindle an increased interest in alternative fuels that once may have been considered too costly to produce. Of particular interest are fuel sources that are considered to be 'renewable.' One of these renewable and alternative energy sources is commonly referred to as biomass.

Biomass generally includes living and recently dead biological material which can be used as fuel or for industrial production. Most commonly, biomass refers to plant matter grown for use as biofuel, but it also includes plant or animal matter used for production of fibers, chemicals or heat. Biomass may also include biodegradable wastes that can be burned as fuel, but it excludes organic material which has been transformed by geological processes into substances known as fossil fuels such as coal or petroleum.

Typical sources of biomass include several plants such as miscanthus, switchgrass, hemp, corn, poplar, willow and sugarcane. The particular plant used is usually not very important to the end products, but it does affect the processing of the raw material. Production of biomass is a growing industry as interest in sustainable fuel sources is growing. While the term biomass is also useful to identify plants where some of the plant's internal structures may not always be considered living tissue, such as the wood of a tree, and even though this biomass was produced from plants that convert sunlight into plant material through photosynthesis, the use of the term 'biomass' herein is by definition limited to agricultural plant growth that is harvested on a regular and periodic basis as part of an agricultural enterprise.

A major source of this biomass results from agricultural activities wherein the plant growth is produced specifically as a biomass product or alternatively is the residue of grain based agricultural crops. Traditionally, agricultural crop residues have been left on the field and reworked into the field's topsoil layer with the intent to return those nutrients removed during the crop's growth cycle and stored in the residue. Studies have revealed that sufficient and even optimal tilth levels in the topsoil layer can be maintained by returning only a fraction of the agricultural crop residue from a particular growth cycle. Until recently, there has been no particular incentive to remove the excess residue from agricultural fields other than for other agricultural uses such as bedding materials or low grade feed for agricultural livestock. However, with the interest in biomass as a renewable energy source, biomass can also now be considered an additional income source from the agricultural growth cycle to supplement the income derived from the harvested grains.

The desire to also harvest biomass from agricultural fields is tempered by the necessary caution to refrain from removing an excess of biomass and thus gradually depleting the topsoil nutrient levels after successive years of harvests. The nutrient needs of the topsoil vary geographically and even vary within the boundaries of a particular field such that determining harvestable quantities is location specific problem and not governed by general parameters applicable across an entire field. Such determinations must be made by an intelligent system that analyzes the topsoil layer concurrent with the harvesting of the biomass.

Thus, what is desired is a biomass harvesting system that efficiently removes the maximum quantity of biomass from a field while leaving sufficient biomass to minimize wind and water erosion and maintain soil tilth.

SUMMARY OF THE INVENTION

The present invention is directed to a biomass harvesting system that satisfies the need for a system to efficiently harvest biomass of agricultural plant growth from an agricultural field while intelligently analyzing the topsoil characteristics to assist in determining the quantity of agricultural plant growth to harvest. The biomass harvesting system comprises in operative combination a power source for providing mechanical and electric power to the system, a biomass accumulator for producing discrete units of accumulated biomass and a windrower for feeding biomass to said biomass accumulator. The system also includes a biomass quality analyzer for determining a set of quality characteristics of the accumulated biomass, a dirt control system for controlling the quantity of dirt in the accumulated biomass, and a ground cover residue monitor for determining on optimal quantity of biomass residue to remain on the agricultural field. An active tracking system identifies individual ones of the discrete units of accumulated biomass.

Another aspect of the present invention is a method of harvesting agricultural plant growth biomass from agricultural fields including the steps of chopping the agricultural plant growth with a chopping unit of a windrower during repeated passes over the agricultural field and windrowing the chopped agricultural plant growth with a windrower for feeding into a biomass accumulator. The chopped and windrowed agricultural plant growth is then scanned with a spectrum analyzer to determine the quality characteristic of the biomass. The ground surface is further scanned with a ground cover residue monitor to determine the quantity of ground cover residue remaining on the agricultural field after windrowing. The chopping unit of the windrower is adjusted to regulate at least one quality characteristic of the biomass and to further regulate, as a function of the sensed ground cover residue quantity, a revised quantity of ground cover residue to remain on the agricultural field after windrowing. The windrowed agricultural plant growth is accumulated into a discrete biomass unit whereupon an identification file with an active tracking system is created for individual ones of the discrete units of accumulated biomass, the identification file at least including quality characteristics of the discrete accumulated biomass unit. The identification file is then associated with the discrete accumulated biomass unit.

These and other features, aspects, and advantages of the invention will be further understood and appreciated by those skilled in the art by reference to the following written specification, claims and appended drawings.

BRIEF DESCRIPTION OF THE DRAWINGS

For a fuller understanding of the nature of the present invention, reference should be made to the accompanying drawings in which.

Like reference numerals refer to like parts throughout the several views of the drawings.

DETAILED DESCRIPTION OF THE PREFERRED EMBODIMENT

Figure 2:
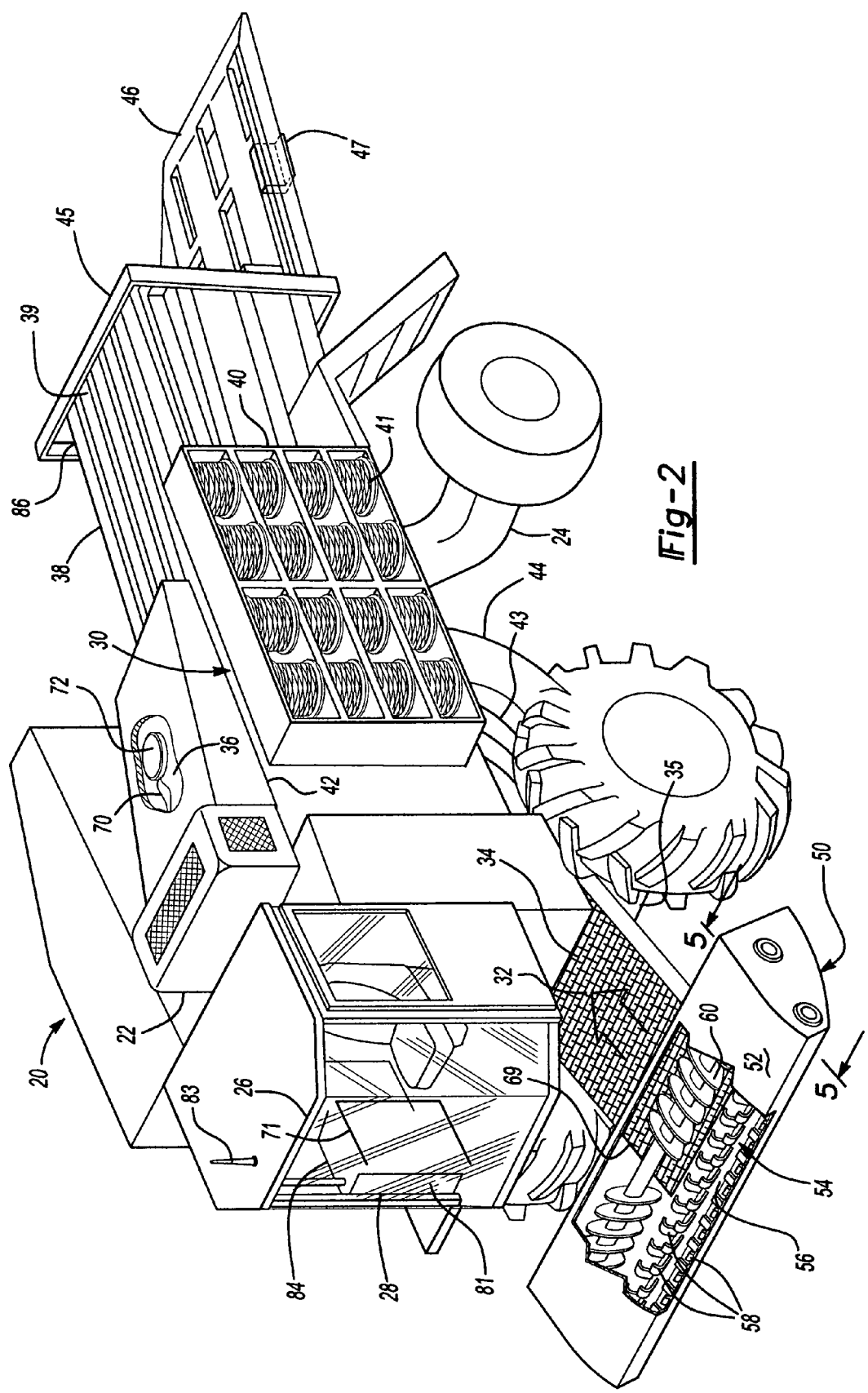
FIG. 2 is a perspective view of a biomass harvesting system embodying the present invention.
Figure 4:
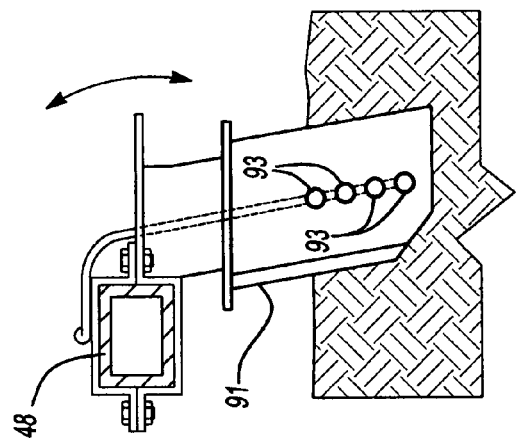
FIG. 4 is a side elevation view of the topsoil quality analyzer engaged in the topsoil layer shown in FIG. 3, taken along the line 4-4.

For purposes of description herein, the terms "upper", "lower", "left", "rear", "right", "front", "vertical", "horizontal", and derivatives thereof shall relate to the invention as oriented in FIG. 2. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
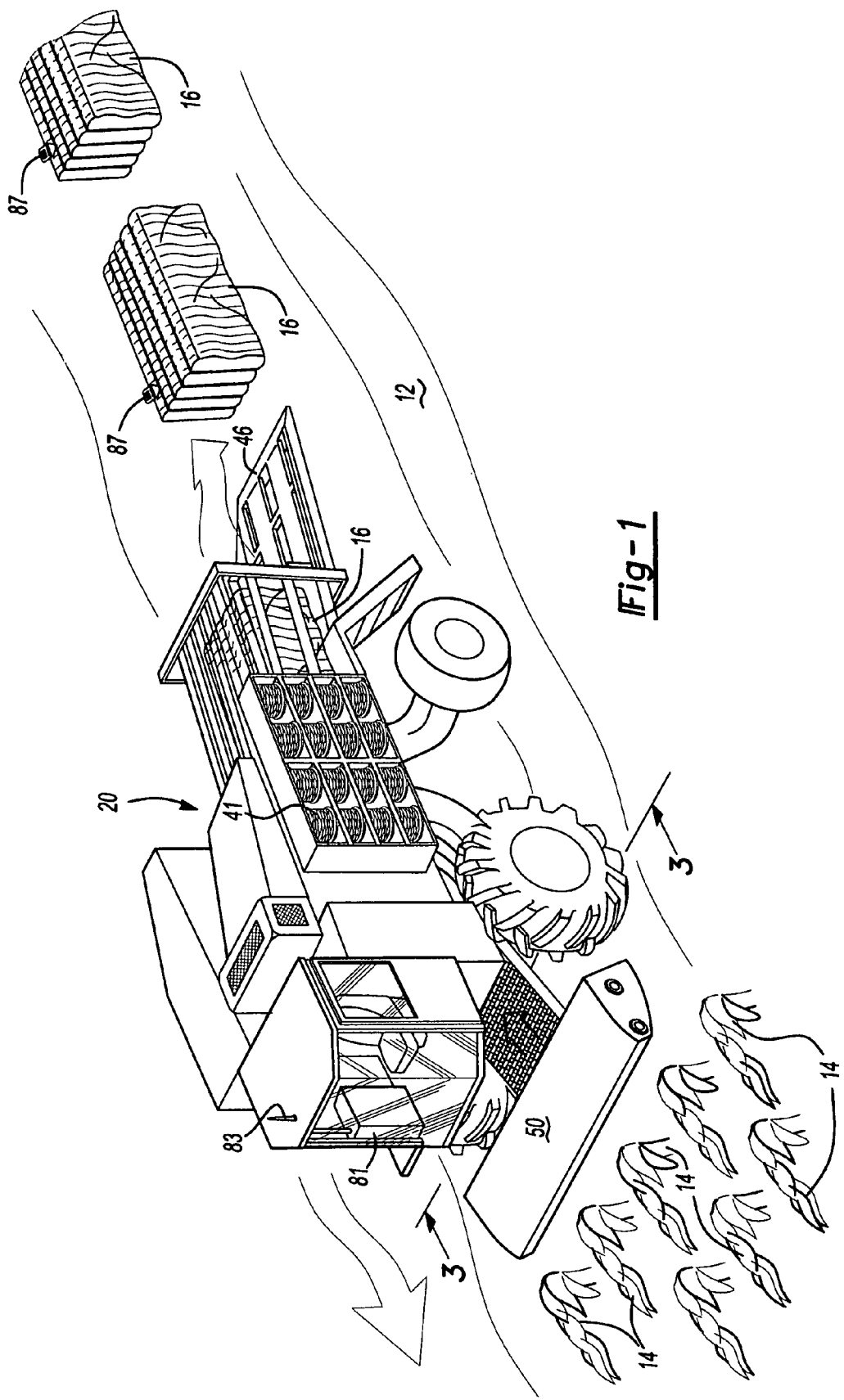
FIG. 1 is a perspective view of a self-propelled biomass harvesting system embodying the present invention, wherein the system is harvesting agricultural crop residue in an agricultural field.

Turning to the drawings, FIG. 1 shows a biomass harvesting system 20 which is one of the preferred embodiments of the present invention and illustrates its various components. Biomass harvesting system 20 is operating in an agricultural field 12 for harvesting in a single pass manner agricultural plant growth 14, here depicted as residual corn stalks remaining after the prior grain harvesting of the corn plants, for the purpose of creating discrete biomass units 16 such as individual bales of cornstalks. While the harvesting system 20 is shown as harvesting cornstalks 14, those practiced in the art will readily recognize that the concepts embodied herein are generally applicable to all biomass harvesting systems, and that agricultural plant growth 14 can comprise plant growth produced specifically as a biomass product or alternatively, as shown, is the residue of grain based agricultural crops after harvesting the grain.

Referring now to FIG. 2, biomass harvesting system 20 includes a power source such as an internal combustion engine 22 mounted on a chassis frame 24 for providing mechanical and electrical power to biomass harvesting system 20. As shown, biomass harvester 20 is a self propelled unit including an enclosed cab 26 in which an operator can sit to control the harvester 20 and monitor its various subsystems.

Also mounted on the chassis 24 is a biomass accumulator 30. Biomass accumulator 30 as shown is a baler that produces a series of discrete biomass units 16 (FIG. 1) or bales of harvested agricultural growth 14. Operation of a baler is well known in the industry and is briefly described herein for clarity. A collecting apron 32 receives a windrow of biomass for harvesting from a windrower 50 (discussed in further detail below). Collecting apron 32 delivers the windrow of harvested biomass to a pre-chopper 34 where the biomass is reduced to smaller pieces to facilitate a uniform density of the final bale of biomass. A predefined quantity of biomass is then captured by a sweep arm or conveyor 35 and delivered to a pre-compression chamber 36 where the predefined quantity of biomass is formed into an individual flake and inserted into compression chamber 38. A bale is comprised of a plurality of individual flakes compressed together in compression chamber 38. Compression chamber 38 includes adjustable sides 39 that are selectively adjustable to constrict or open the cross-sectional area of the compression chamber end 45. Adjusting sides 39 to increase constriction results in higher density bales while conversely, decreasing constriction results in lower density bales. Thus, the density of the biomass bales produced can be selectively controlled by the operator to meet specific demands. Once the series of accumulated flakes reaches a predefined volume, needles 43 travel through needle guards 44 to thread a series of twine strands through the series of accumulated flakes in compression chamber 38. In such manner, the twine strands fed from twine spools 41 in twine rack 40 completely surround the series of flakes whereupon knotting mechanism 42 securely ties ends of the twine strands in knots thereby securing the plurality of flakes together in a single bale 16. As bales 16 continue to exit from compression chamber end 45, bales 16 are temporarily supported on trailing platform 46 until completely exited from compression chamber 38 whereupon bales 16 are allowed to fall to the ground for later retrieval.

Biomass harvesting system 20 has a windrower 50 mounted at a front thereof. Windrower 50 can collect pre-cut or pre-chopped biomass from a wide swath or, as shown, comprises a housing 52 operatively retaining a chopping unit 54 for simultaneously chopping the agricultural plant growth 14 and delivering the chopped plant growth 14 to a transporter 60, here shown as an auger 62. Alternatively, transporter 60 can comprise a mesh belt (not shown). Transporter 60 accumulates the chopped plant growth from the entire swath width covered by windrower 50 and delivers the chopped plant growth to a central windrow exit 69 for discharge onto collecting apron 32. Chopping unit 54 typically comprises one or more rotating drums 56 to which are pivotally affixed a plurality of flail knives 58. Those practiced in the art will readily recognize that flail knives can conform to a plurality of design configurations known in the agricultural industry.

The biomass harvesting system 20 further includes additional subsystems for analyzing the quality of the biomass being harvested, and the condition of the agricultural field topsoil to optimize the quantity and quality of the biomass bales 16 produced thereby. Several determinations must be made by an intelligent system that analyzes the topsoil layer concurrent with the harvesting of the biomass. In such a manner, harvesting system 20 includes a central processing unit 28 that has a memory module with an executable instruction set stored therein. Central processing unit 28 executing the instruction set integrates the operation of biomass accumulator 30 and windrower 50 with subsystems such as biomass quality analyzer 70, dirt control system 63, ground cover residue monitor 76, active tracking system 81 and soil chemical analyzer 90 to maximize the biomass quality and quantity being harvested while providing agricultural field 12 with sufficient biomass residue for erosion control and nutrient replenishment.

Biomass quality analyzer 70 comprises a spectrometer 71 that receives electronic signals from a sensor head 78 positioned in proximity to the path of the biomass as the biomass transits through biomass accumulator 30. Spectrometer 71 samples via sensor head 72 the biomass throughput at predetermined time intervals. Spectrometer 71 chemically analyzes the spectral signature of the biomass entering the precompression chamber 36 of baler 30. This spectrometer data is analyzed to extract relevant chemical quality data of the biomass, determining such characteristics as moisture, dirt, cellulose, lignin, hemicellulose, fungal contamination and other characteristics. Individual sample signals are integrated across all of the biomass sampled and compressed into each discrete bale 16. The integrated quality data is transmitted to central processing unit 28 for further processing according to the executable instruction set.

Referring now to FIGS. 2, and 5-7, the dirt control system 63 utilizes the dirt levels sensed by biomass quality analyzer 70 to determine if the amount of dirt contained in the biomass is at an acceptable level, or if there is excessive dirt in the biomass. If the dirt level is determined to be excessive, the excess dirt and other unwanted particles must be sifted out of the biomass stream. The central processing unit 28 issues commands to perform tasks individually or in combination to adjust the speed of harvesting system 20 across agricultural field 12, to raise or lower the height of chopping unit 54 above the surface of agricultural field 12, and to adjust the rotational speed of chopping unit 54 to reduce the amount of dirt picked up by flail knives 58. Further, operational speed of transporter 60 is modifiable in response to commands from central processor 28.

Figure 5:
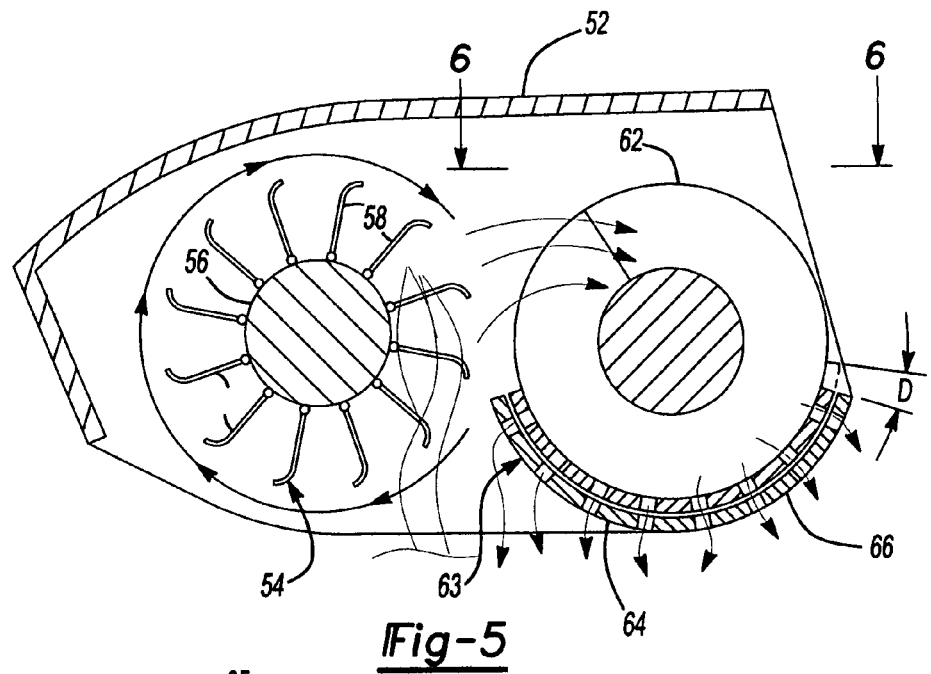
FIG. 5 is a side elevation cross-sectional view of a representative chopping head of the biomass harvesting system shown in FIG. 2 and taken along the line 5-5.
Figure 6:
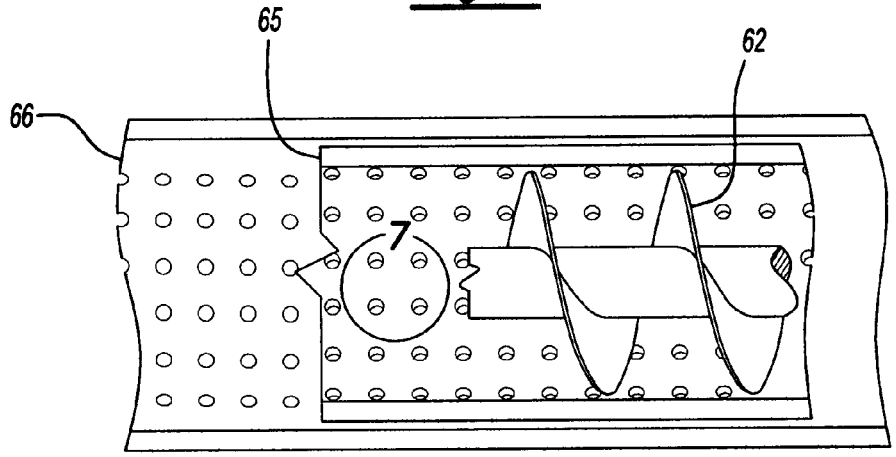
FIG. 6 is a top view of the auger portion of the chopping head shown in FIG. 5 and taken along the line 6-6.
Figure 7:
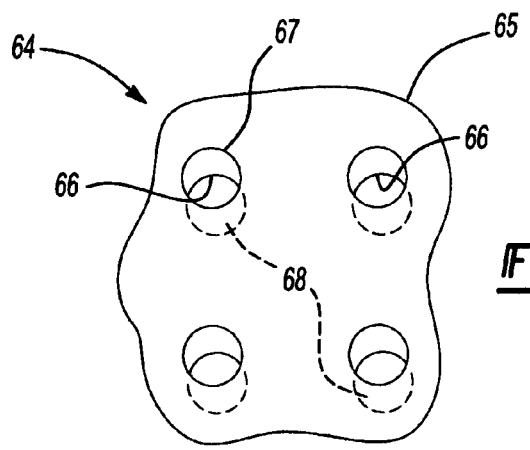
FIG. 7 is an enlarged plan view of the slotted housing for the auger shown in FIG. 6 and denoted by the numeral 7, FIG. 6.

Transporter 60, as shown, has at least one auger 62 in a slotted housing 64 for feeding the biomass to windrow exit 69. Slotted housing 64 includes first and second arcuate housing members 65, 66 wherein first arcuate housing member 65 is nested within second arcuate housing member 66. Each housing member 65, 66 defines a plurality of slots 67, 68 respectively or apertures in a lower portion thereof in a predefined and substantially identical pattern such that translation of first housing member 65 with respect to second housing member 66 will vary the final slot size for allowing dirt and particulate materials to be sifted out of the biomass being transported therealong. Such translation is represented in FIG. 5 by angular displacement 'D.'

When quality sensor 72 detects an excess of dirt or unwanted particulates in the biomass, the excess dirt signal is transmitted to central processing unit 28, and in response thereto central processing unit 28 commands slotted housing 64 to adjust the alignment of slots 67, 68 to enlarge the slot openings and thereby increase the sifting out of unwanted dirt and particulates. Alternatively, transport 60 can comprise a mesh belt of variable composition which allows dirt to fall through (not shown). Further dirt control system can be augmented by an air stream (not shown) with adjustable volume and pressure controls for directing air over and through the biomass to assist in dirt and fine particulate removal.

Figure 3:
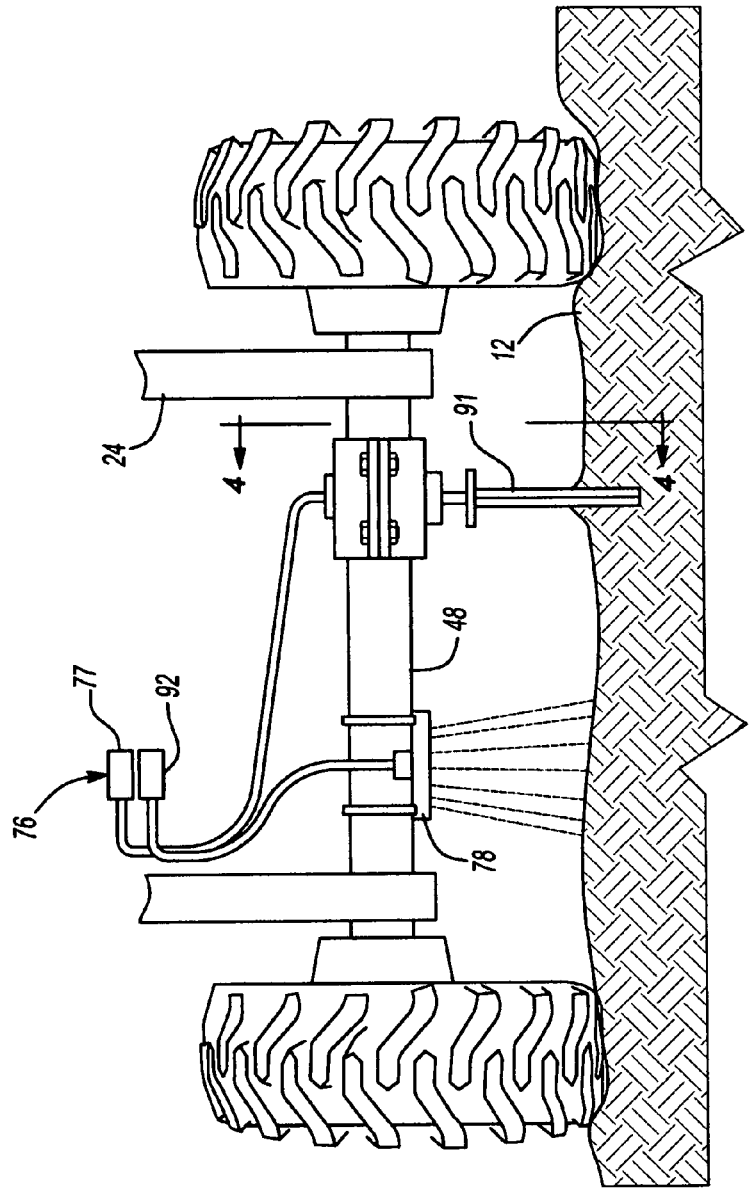
FIG. 3 is an cross-sectional view of the lower portion of the harvesting system shown in FIGS. 1 and 2, taken along the line 3-3, FIG. 1 and illustrating the positioning of topsoil analysis sensors.

As illustrated in FIGS. 2 and 3, harvesting system 20 also includes a ground cover residue monitor system 76 comprising an analyzer 77 and an associated sensor head 78 mounted on sensor bar 48 positioned behind windrower 50. Ground cover residue monitor system 76 can be either a spectroscopy based system or an imaging analysis base system. In use, sensor head 78 scans the surface of agricultural field 12 during operation of harvesting system 20 and transmits associated electrical signals to analyzer 77 for determination of the quantity of agricultural plant growth 14 remaining on the surface of agricultural field 12. The quantity data in turn is transmitted to central processing unit 28 which in response to the executed instruction set determines the desired quantity of agricultural plant growth 14 to remain on the surface of agricultural field 12 for proper nutrient retention and erosion control. If central processing unit 28 determines the amount of agricultural plant growth 14 to be left on field 12 requires modification, associated control signals are transmitted to windrower 50 to increase or decrease the size of the slots in slotted housing 64 and, in combination therewith or independently therefrom, to raise or lower chopping unit with respect to the surface of agricultural field 12.

A soil chemical analyzer 90 can also be integrated with biomass harvesting system 20. Soil chemical analyzer 90 typically comprises a spectrometer 92 and at least one sensor head 93 embedded within a soil penetration element 91. Soil penetration element 91 is mounted to sensor bar 48 and includes provisions for being selectively movable between a first position raised above the surface of agricultural field 12 and a second position wherein the soil penetration element 91 is engaged within the topsoil layer of agricultural field 12. Typically, soil penetration element 91 is a knife-edged blade that penetrates from one to six inches below ground surface. Sensor head 93 is embedded in a side of element 91 such that periodic samples of the topsoil chemical composition can be sensed as sensor head 93 passes the soil at a predetermined depth. A vertical chemical profile of the topsoil layer can be obtained by embedding a plurality of sensor heads 93 in a vertically spaced arrangement in soil penetration element 91. Each sensor head 93 is associated with a compatible spectrum analyzer 92 and samples the chemical composition at its predetermined depth. The resulting chemical composition data is transmitted to central processing unit 28 for compilation into a spatial map of the chemical composition of agricultural field 12. Further, the derived chemical composition data can be utilized by central processing unit 28 to aid in determining the quantity of agricultural plant growth 14 to remain on agricultural field 12 after harvesting of the biomass. Excess removal of agricultural plant growth costs the producer by requiring alternative costly means of replacing nutrients.

Harvesting system 20 would also ideally be tied into an active tracking system 81 that provides location specific geographic information such as a global positioning system. Global positioning system includes a GPS antenna 83 mounted on harvesting system 20 and interconnected with GPS receiver 84 which is also integrated with central processing unit 28. As an alternative, tracking devices can be affixed to individual bales 16 by utilizing a radio frequency identification (RFID) system 86 that attaches an RFID tag 87 to each biomass bale 16. In operation, and with utilization of a GPS system in operable association with central processing unit 28, an identification file for an individual bale 16 is created wherein the identification file includes geographical location and quality characteristics of the bale 16. In addition, trailing platform 46 can also include a weight sensor 47 that is typically strain gauge based for determining the weight of individual bales 16 for inclusion in the data file for each bale 16. The bale 16 location is later recalled when the bale is collected and is thus positionally tracked throughout its handling. Alternatively, when an RFID system 86 is incorporated in operable association with central processing unit 28, an identification file is created for an individual bale 16 of accumulated biomass. The identification file includes quality characteristics of individual bale 16 and the identification file is transferred to a radio frequency identification tag 87 for attachment to bale 16 upon creation thereof. In such manner and as long as tag 87 is attached to bale 16, the quality characteristics of bale 16 are readily available by electronically reading the identification file stored thereon.

The location specific geographic information system is important because it allows biomass units to be aggregated, stored, transported and processed in a non-linear manner. For example, discrete biomass units such as bales 16 harvested with elevated moisture content and hence susceptible to uncontrolled decay can be aggregated and preferentially processed while ambient environmental conditions are cold enough to inhibit spoilage.

In use, biomass harvesting system 20 is utilized for harvesting agricultural plant growth 14 from agricultural fields 12. Initially, the agricultural plant growth 14 is chopped with a chopper unit 54 of a windrower 50 during repeated passes over the agricultural field and windrowing the chopped agricultural plant growth 14 with windrower 50 for feeding into biomass accumulator 30. The chopped and windrowed agricultural plant growth 14 is then scanned with a biomass quality analyzer 70 to determine the quality characteristic of the biomass. The ground surface is further scanned with a ground cover residue monitor 76 to determine the quantity of ground cover residue remaining on the agricultural field 12 after windrowing. The chopping unit 54 of the windrower 50 is adjusted to regulate at least one quality characteristic of the biomass such as the dirt content as sensed by biomass quality analyzer 70 and to further regulate, as a function of the sensed ground cover residue quantity, a revised quantity of ground cover residue to remain on the agricultural field 12 after windrowing. The windrowed agricultural plant growth 14 is accumulated into a discrete biomass unit such as a bale 16 whereupon an identification file with an active tracking system 81 is created for individual ones of the bales 16. The identification file includes quality characteristics of bale 16. The identification file is then associated with bale 16 by either attaching an RFID tag 87 or assigning a GPS geographic identifier with the bale 16 for later recovery. A soil chemical analyzer 90 can further be used to pass a soil penetration element 91 having sensors 93 embedded therein through the topsoil layer of the agricultural field 12 to determine the vertical chemical profile of the topsoil and further utilizing this chemical data to partially determine the proper adjustment of the windrower 50.

Figure 8:
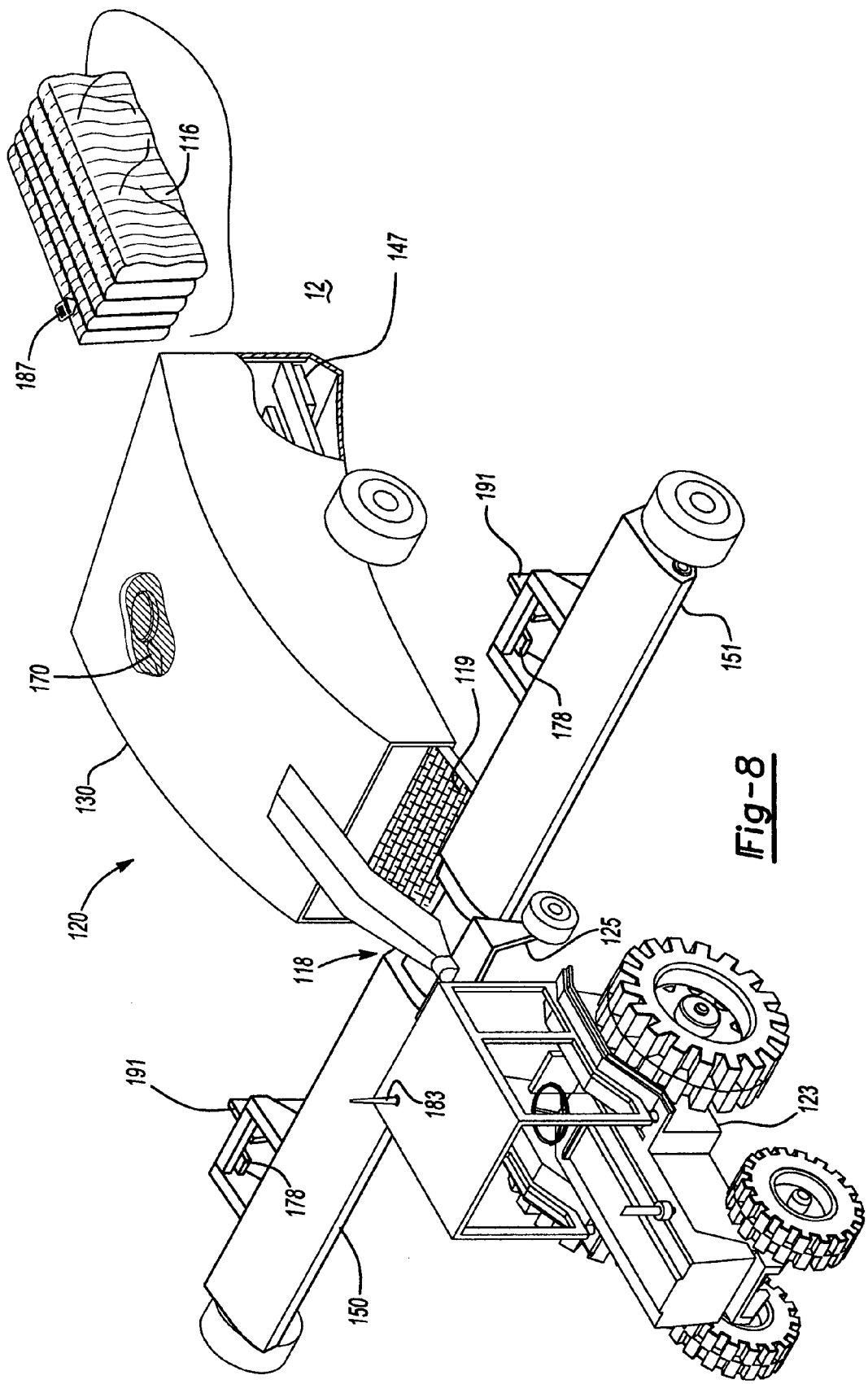
FIG. 8 is a perspective view of a modular biomass harvesting system pulled by an agricultural tractor and embodying the present invention, wherein the system is harvesting agricultural crop residue in an agricultural field.

FIG. 8 illustrates an alternate embodiment of a modular biomass harvesting system 120. Modular system 120 includes a tractor 123 for providing mechanical and electrical power to harvesting system 120. A toolbar 125 is attached to tractor 123 and in turn at least one windrower 150 and alternatively a second windrower 151 are attached to toolbar 125 for being drawn through an agricultural field 12. Windrowers 150, 151 operate in a similar manner with similar features as windrower 50 as described above. One or both windrowers 150, 151 have mounted to a rear portion thereof a ground cover residue monitor sensor head 178 and a soil chemical analyzer 190 that operate in similar manner as ground cover residue monitor sensor head 78 and soil chemical analyzer 90 for harvesting system 20 as described above. A biomass accumulator 130 is also attached to toolbar 125 and is positioned to trail behind windrowers 150 and 151 in such a manner to simultaneously gather the biomass streams 118 and 119 from windrowers 150 and 151 respectively. Biomass accumulator 130 is typically a baler that is of a standard and known design for producing bales 116. Baler 130 also has associated therewith a biomass quality analyzer 170 for sensing quality characteristics of the biomass transiting baler 130. System 120 also includes an active tracking system for attaching RFID tags 187 and for geographical positioning utilizing a GPS system as evidence by GPS antenna 183 on tractor 123. A central processing unit (not shown) integrates all sensor subsystems and can be located in tractor 123 or another convenient location on modular harvesting system 120.

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law, including the doctrine of equivalents.

I claim:

1. A biomass harvesting system for harvesting agricultural plant growth from agricultural fields, said biomass harvesting system comprising in operative combination:

a power source for providing mechanical and electric power to said system;

a biomass accumulator for producing discrete units of accumulated biomass;

a windrower for feeding biomass to said biomass accumulator;

a biomass quality analyzer for determining a set of quality characteristics of the accumulated biomass, said biomass quality analyzer comprising a spectrometer and an associated sensor head connected thereto, said sensor head positioned to scan the stream of chopped agricultural plant growth fed to the biomass accumulator from the windrower;

a dirt control system for controlling the quantity of dirt in the accumulated biomass;

a ground cover residue monitor for determining on optimal quantity of biomass residue to remain on the agricultural field;

an active tracking system for identifying individual ones of the discrete units of accumulated biomass; and a central processing unit including a memory module storing an executable instruction set therein, said central processing unit being responsive to said executed instruction set for integrated management of said dirt control system, said biomass quality analyzer, said ground cover residue monitor, and said active tracking system;

said windrower having at least one chopping unit for chopping the agricultural plant growth and a transporter for collecting the chopped agricultural plant growth, said transporter moving the chopped agricultural plant growth to a windrow for collection by said biomass accumulator, said transporter having adjustable slots therein for the selective sifting out of unwanted particles; and said central processing unit adjusting a height above ground surface of said chopping unit, a speed of said chopping unit, and a size of said adjustable slots in said transporter in response to electronic signals received from said biomass quality analyzer representing a quantity of unwanted particles contained in the chopped agricultural plant growth.

2. A biomass harvesting system for harvesting agricultural plant growth from agricultural fields, said biomass harvesting system comprising in operative combination:
a power source for providing mechanical and electric power to said system;
a biomass accumulator for producing discrete units of accumulated biomass;
a windrower for feeding biomass to said biomass accumulator;
a biomass quality analyzer for determining a set of quality characteristics of the accumulated biomass;
a dirt control system for controlling the quantity of dirt in the accumulated biomass;
a ground cover residue monitor for determining on optimal quantity of biomass residue to remain on the agricultural field;
an active tracking system for identifying individual ones of the discrete units of accumulated biomass; and
a central processing unit including a memory module storing an executable instruction set therein, said central processing unit being responsive to said executed instruction set for integrated management of said dirt control system, said biomass quality analyzer, said ground cover residue monitor, and said active tracking system; and further wherein:
said central processing unit adjusts a height above ground surface of said chopping unit, a speed of said chopping unit, and a size of said adjustable slots in said transporter in response to electronic signals received from said ground cover residue monitor representing a quantity of agricultural plant growth remaining on the ground surface after the chopped agricultural plant growth has been removed therefrom.

3. The biomass harvesting system according to claim 2 wherein said biomass accumulator is a baler and the discrete units of accumulated biomass produced thereby are individual bales of accumulated biomass.

4. The biomass harvesting system according to claim 2 wherein said windrower includes:
at least one chopping unit for chopping the agricultural plant growth; and
a transporter for collecting the chopped agricultural plant growth and moving the chopped agricultural plant growth to a windrow for collection by said biomass accumulator.

5. The biomass harvesting system according to claim 4 wherein said chopping unit is a flail chopper.

6. The biomass harvesting system according to claim 4 wherein said transporter includes at least one auger within a slotted housing, said slotted housing being adjustable to regulate a cross-sectional area of individual slots to permit the sifting out of unwanted particulates.

7. The biomass harvesting system according to claim 4 wherein said transporter comprises a variable mesh belt to permit the sifting out of unwanted particulates.

8. The biomass harvesting system according to claim 2 wherein said ground cover residue monitor comprises a spectrometer and an associated sensor head connected thereto, said sensor head positioned behind said windrower for scanning the ground surface after the chopped agricultural plant growth has been removed therefrom.

9. The biomass harvesting system according to claim 2 wherein said ground cover residue monitor comprises an image analyzer and an associated sensor head connected thereto, said sensor head positioned behind said windrower for scanning the ground surface after the chopped agricultural plant growth has been removed therefrom.

10. The biomass harvesting system according to claim 2 wherein said active tracking system includes a global positioning system in operable association with said central processing unit, said active tracking system creating an identification file for individual ones of the discrete units of accumulated biomass, said identification file including geographical location and quality characteristics of the biomass unit.

11. The biomass harvesting system according to claim 2 further including a soil chemical analyzer.

12. A biomass harvesting system for harvesting agricultural plant growth from agricultural fields, said biomass harvesting system comprising in operative combination:
a power source for providing mechanical and electric power to said system;
a biomass accumulator for producing discrete units of accumulated biomass;
a windrower for feeding biomass to said biomass accumulator;
a biomass quality analyzer for determining a set of quality characteristics of the accumulated biomass;
a dirt control system for controlling the quantity of dirt in the accumulated biomass;
a ground cover residue monitor for determining on optimal quantity of biomass residue to remain on the agricultural field;
an active tracking system for identifying individual ones of the discrete units of accumulated biomass; and
a central processing unit including a memory module storing an executable instruction set therein, said central processing unit being responsive to said executed instruction set for integrated management of said dirt control system, said biomass quality analyzer, said ground cover residue monitor, and said active tracking system; and further wherein:
said active tracking system includes a radio frequency identification system in operable association with said central processing unit, said active tracking system creating an identification file for individual ones of the discrete units of accumulated biomass, said identification file including quality characteristics of the biomass unit and further wherein said active tracking system transfers said identification file to a radio frequency identification tag for attachment to the biomass unit upon creation thereof.

13. A biomass harvesting system for harvesting agricultural plant growth from agricultural fields, said biomass harvesting system comprising in operative combination:
a power source for providing mechanical and electric power to said system;
a biomass accumulator for producing discrete units of accumulated biomass;
a windrower for feeding biomass to said biomass accumulator;
a biomass quality analyzer for determining a set of quality characteristics of the accumulated biomass;
a dirt control system for controlling the quantity of dirt in the accumulated biomass;
a ground cover residue monitor for determining on optimal quantity of biomass residue to remain on the agricultural field;

an active tracking system for identifying individual ones of the discrete units of accumulated biomass;

a central processing unit including a memory module storing an executable instruction set therein, said central processing unit being responsive to said executed instruction set for integrated management of said dirt control system, said biomass quality analyzer, said ground cover residue monitor, and said active tracking system; and a soil chemical analyzer including:
  a soil penetration element;
  a spectrometer communicatively integrated with said central processing unit; and
  at least one sensor head operatively connected to said spectrometer, said at least one sensor head mounted on said soil penetration element for vertical profile scanning of the topsoil layer of the agricultural field to determine a vertical chemical profile of the topsoil layer after the chopped agricultural plant growth has been removed therefrom.

14. The biomass harvesting system according to claim 13 wherein said soil chemical analyzer comprises a plurality of spectrometers and a like plurality of sensor heads mounted on said soil penetration element in a vertically spaced apart arrangement, each said sensor head associated with a spectrometer.

15. A method of harvesting agricultural plant growth biomass from agricultural fields, said harvesting method comprising the steps of:

chopping the agricultural plant growth with a chopper portion of a windrower during repeated passes over the agricultural field;

windrowing the chopped agricultural plant growth with a windrower for feeding into a biomass accumulator;

scanning the chopped and windrowed agricultural plant growth with a spectrum analyzer to determine the quality characteristic of the biomass;

scanning the ground with a ground cover residue monitor to determine the quantity of ground cover residue remaining on the agricultural field after windrowing;

adjusting the chopper portion of the windrower to regulate at least one quality characteristic of the biomass and to further regulate, as a function of the sensed ground cover residue quantity, a revised quantity of ground cover residue to remain on the agricultural field after windrowing;

accumulating the windrowed agricultural plant growth into a discrete biomass unit;

creating an identification file with an active tracking system for individual ones of the discrete units of accumulated biomass, said identification file at least including quality characteristics of the discrete accumulated biomass unit; and associating the identification file with the discrete accumulated biomass unit.

16. The harvesting method according to claim 15 including after the step of scanning the chopped and windrowed agricultural plant growth, the further step of:

passing a soil chemical analyzer through the topsoil layer of the agricultural field to determine the chemical composition of the topsoil.

17. The harvesting method according to claim 16 wherein the step of adjusting the chopper portion is further regulated as a function of the sensed topsoil chemical composition.

* * * * *